United States Patent
Mita

(10) Patent No.: US 9,166,464 B2
(45) Date of Patent: Oct. 20, 2015

(54) MAGNETIC GEAR DEVICE AND HOLDING MEMBER

(75) Inventor: Masahiro Mita, Gunma (JP)

(73) Assignee: Hitachi Metals, Ltd., Tokyo (JP)

( * ) Notice: Subject to any disclaimer, the term of this patent is extended or adjusted under 35 U.S.C. 154(b) by 339 days.

(21) Appl. No.: 13/813,127

(22) PCT Filed: Jun. 20, 2011

(86) PCT No.: PCT/JP2011/064007
§ 371 (c)(1),
(2), (4) Date: Jan. 29, 2013

(87) PCT Pub. No.: WO2012/014596
PCT Pub. Date: Feb. 2, 2012

(65) Prior Publication Data
US 2013/0127278 A1 May 23, 2013

(30) Foreign Application Priority Data

Jul. 29, 2010 (JP) .................................. 2010-169955
Aug. 30, 2010 (JP) .................................. 2010-192638

(51) Int. Cl.
*H02K 49/00* (2006.01)
*H02K 49/10* (2006.01)
*H02K 1/27* (2006.01)

(52) U.S. Cl.
CPC .............. *H02K 49/102* (2013.01); *H02K 1/278* (2013.01); *H02K 1/2793* (2013.01); *H02K 49/106* (2013.01); *H02K 49/108* (2013.01)

(58) Field of Classification Search
CPC ........................... H02K 49/102; H02K 49/065
USPC ........................................................... 310/103
See application file for complete search history.

(56) References Cited

U.S. PATENT DOCUMENTS

| 4,100,441 A | 7/1978 | Landry |
| 2008/0030090 A1 | 2/2008 | Abe et al. |

(Continued)

FOREIGN PATENT DOCUMENTS

| CN | 201027950 Y | 2/2008 |
| DE | 32 46 422 A1 | 6/1984 |

(Continued)

OTHER PUBLICATIONS

K. Atallah, "Design, analysis and realization of a high-performance magnetic gear," *IEE Proceedings-Electric Power Applications*, U.K., Mar. 2004, vol. 151, No. 2, pp. 135 to 143.

(Continued)

*Primary Examiner* — Hanh Nguyen
(74) *Attorney, Agent, or Firm* — Muncy, Geissler, Olds & Lowe, P.C.

(57) ABSTRACT

A magnetic gear device including: an internal rotor and an external rotor in which a plurality of magnetic pole pairs are each placed in a circumferential direction substantially at equal intervals; and a holding member that is placed between the internal rotor and the external rotor and holds a plurality of magnetic materials in the circumferential direction substantially at equal intervals, wherein the number of magnetic materials is a difference between or a total of the numbers of magnetic pole pairs, the holding member includes a plurality of circular rings that hold the magnetic materials, and connecting rods that are placed in the circumferential direction substantially at equal intervals and connect the plurality of circular rings, the plurality of circular rings face each other via the magnetic materials, and each number of magnetic pole pairs is set to have the number of connecting rods as a divisor.

10 Claims, 10 Drawing Sheets

(56) References Cited

U.S. PATENT DOCUMENTS

| | | | |
|---|---|---|---|
| 2011/0037333 A1* | 2/2011 | Atallah et al. | 310/98 |
| 2011/0156518 A1* | 6/2011 | Bright | 310/103 |
| 2012/0194021 A1* | 8/2012 | Nakatsugawa et al. | 310/103 |

FOREIGN PATENT DOCUMENTS

| | | |
|---|---|---|
| JP | 43-1942 B1 | 1/1968 |
| JP | H9-280341 | 10/1997 |
| JP | 2008-039045 | 2/2008 |
| JP | 2009-95173 | 4/2009 |
| JP | 2010-106940 | 5/2010 |
| WO | WO 2009/087408 | 7/2009 |

OTHER PUBLICATIONS

Tetsuya Ikeda, Kenji Nakamura and Osamu Ichinokura "A Way to Improve Efficiency of Permanent-Magnet Magnetic Gears", *Journal of Magnetics Society, 2009*, vol. 33, No. 2, pp. 130 to 134.

K. Atallah, J. Wang, D. Howe, "A high-performance linear magnetic gear," Journal of Applied physics, U.S., 2005, vol. 97, No. 10, 10N516, pp. 1 to 3.

\* cited by examiner

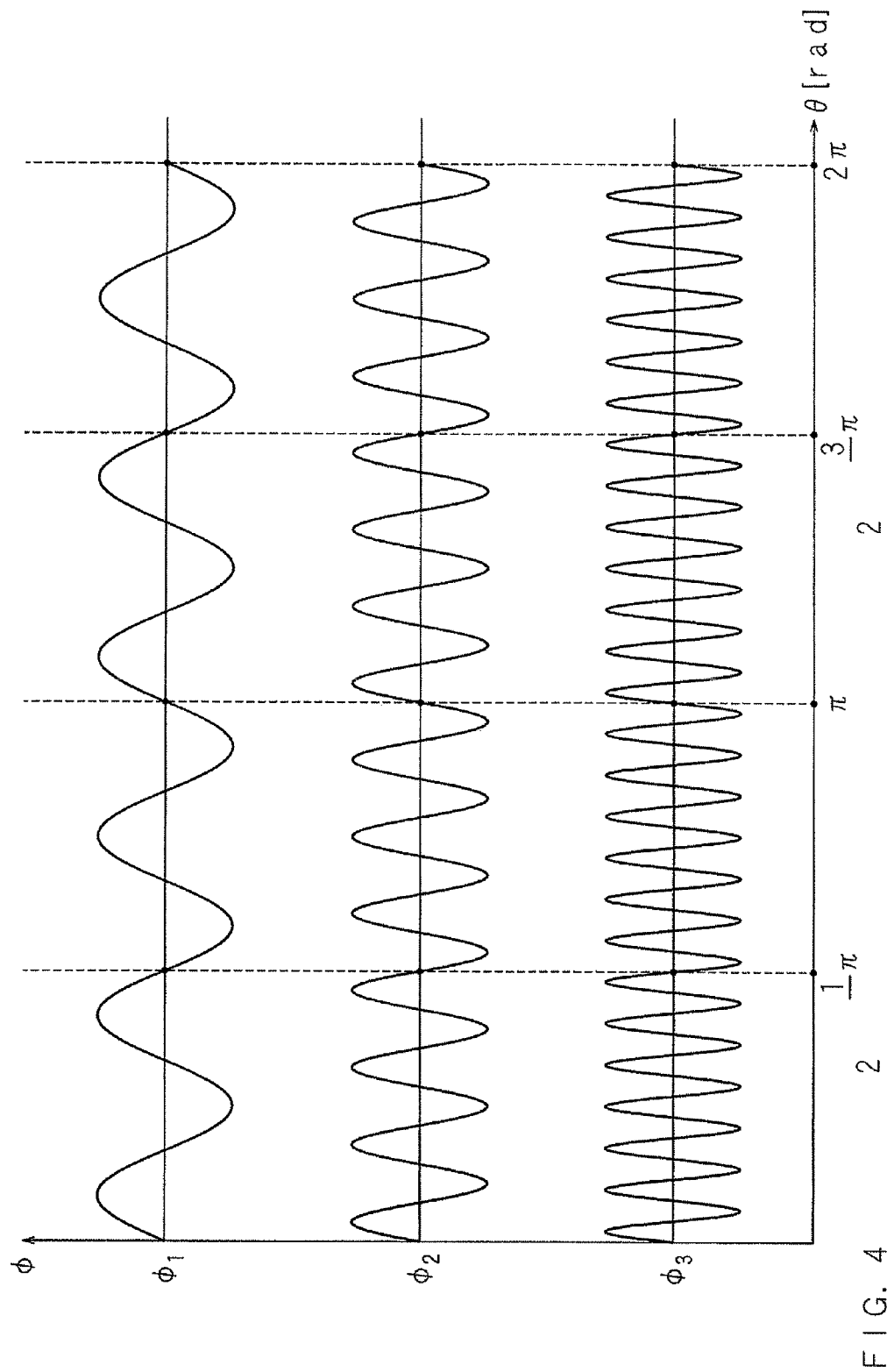
F I G. 4

MAGNETIC GEAR DEVICE AND HOLDING MEMBER

This application is the national phase under 35 U.S.C. §371 of PCT International Application No. PCT/JP2011/064007 which has an International filing date of Jun. 20, 2011 and designated the United States of America.

FIELD

The present invention relates to a magnetic gear device and a holding member capable of suppressing an eddy current loss.

BACKGROUND

Non-contact gear devices include magnetic gear devices. A magnetic gear device includes a first movable element and a second movable element in which a plurality of magnetic pole pairs having different magnetic poles are placed on an operating surface side at equal intervals. For example, the first movable element and the second movable element have a cylindrical shape, a disk shape or a flat plate shape. A plurality of magnetic materials functioning as pole pieces are placed between the first movable element and the second movable element at equal intervals. When the first movable element is moved, the second movable element is moved by magnetic interactions between the magnetic pole pairs each included in the first movable element and the second movable element. A gear ratio of the second movable element with respect to the first movable element is decided depending on a combination of the numbers of magnetic pole pairs of the first movable element and the second movable element. The operating surface mentioned here refers to facing surface sides of the first movable element and the second movable element that face each other with the plurality of magnetic materials interposed therebetween.

There are magnetic gear devices such as a cylindrical rotary type magnetic gear device including an internal rotor and an external rotor as the first movable element and the second movable element or a cylindrical linear type magnetic gear device including an internal column and an external column as the first movable element and the second movable element (for example, see Non-Patent Document 1 and Non-Patent Document 3). The cylindrical rotary type magnetic gear device includes a cylindrical internal rotor, a cylindrical external rotor into which the internal rotor is fitted at an interval, and a cylindrical intermediate yoke inserted between the internal rotor and the external rotor at an interval. On each of an outer peripheral surface of the internal rotor and an inner peripheral surface of the external rotor, a plurality of magnetic pole pairs constituted by an N pole magnet and an S pole magnet are placed in a circumferential direction. The intermediate yoke holds a plurality of ferromagnetic magnetic materials in the circumferential direction at equal intervals.

When the external rotor rotates, the internal rotor rotates by the magnetic interaction between the magnetic pole pairs each included in the internal rotor and the external rotor. Herein, when the numbers of the magnetic poles each placed in the internal rotor and the external rotor are set to Ph and Pl, an alternating magnetic field is generated in a radial direction along with the rotation of the internal rotor and the external rotor. Herein, when the number of magnetic materials held by the intermediate yoke is set to Ns, the alternating magnetic field mainly includes a $Ph^{th}$ harmonic component, an $(Ns-Ph)^{th}$ harmonic component and an $(Ns+Ph)^{th}$ harmonic component (for example, see Non-Patent Document 2).

Because the internal rotor and the external rotor rotate in synchrony with the alternating magnetic field including the three harmonic components, the number Pl of the magnetic pole pairs placed in the external rotor is set to (Ns−Ph) or (Ns+Ph) (for example, see Non-Patent Document 2). In other words, the number Ns of the magnetic materials held by the intermediate yoke is set to (Ph+Pl) or (Pl−Ph).

FIG. 10 is a schematic assembly view that shows an example of a cylindrical rotary type magnetic gear device of the related art. The magnetic gear device includes an internal rotor 100, an intermediate yoke 200, and an external rotor 300. On an outer peripheral surface of the internal rotor 100, three magnetic pole pairs 102 including a magnet 102a with N pole at outer side and a magnet 102b with S pole at outer side magnetized in a thickness direction are placed in the circumferential direction. Furthermore, on an inner peripheral surface of the external rotor 300, seven magnetic pole pairs 302 including a magnet 302a with N pole at inner side and a magnet 302b with S pole at inner side magnetized in a thickness direction are placed in the circumferential direction. Thereby, the magnetic gear device shown in FIG. 10 has a gear ratio of 3/7.

The intermediate yoke 200 holds a total of ten magnetic materials 202 of the numbers 3 and 7 of the magnetic pole pairs 102 and 302 included in each of the internal rotor 100 and the external rotor 300 in the circumferential direction at equal intervals. For example, the intermediate yoke 200 is manufactured by fixing each magnetic material 202 to a resin formed in a cylindrical shape (see Patent Document 1). The alternating magnetic field including a third harmonic component, a seventh harmonic component and a thirteenth harmonic component generated by the magnetic pole pairs 102 and 302 intersects with the intermediate yoke 200 in a radial direction.

Patent Document 1: Pamphlet of International Patent Publication WO 2009/087408

Non-Patent Document 1: K. Atallah, "Design, analysis and realization of a high-performance magnetic gear," IEE Proceedings-Electric Power Applications, U.K., March, 2004, volume 151, No. 2, pages 135 to 143

Non-Patent Document 2: Tetsuya Ikeda, Kenji Nakamura and Osamu Ichinokura "A Way to improve Efficiency of Permanent-Magnet Magnetic Gears" Journal of Magnetic Society, 2009, volume 33, No. 2, pages 130 to 134

Non-Patent Document 3: K. Atallah, J. Wang, D. Howe, "A high-performance linear magnetic gear," Journal of Applied physics, U.S., 2005, volume 97, No. 10, 10N516—pages 01 to 03

SUMMARY

However, in the related art, for example, when a holding member configured to hold the magnetic materials is made of a metal to form the intermediate yoke, and strength of the intermediate yoke is secured, a conductive closed loop intersecting with the alternating magnetic field is formed on the holding member causing the eddy current to flow, and the eddy current loss is generated.

The present application has been made taking these circumstances into consideration. The present application is directed to provide a magnetic gear device and a holding member capable of suppressing an eddy current loss due to the fact that each number of the plurality of magnetic pole pairs placed in the first movable element and the second movable element has the number of a plurality of connecting rods of the holding member as a divisor.

Furthermore, the present application is directed to provide a magnetic gear device and a holding member capable of suppressing the eddy current loss by setting the number of the plurality of connecting rods of the holding member to a divisor of each number of the plurality of magnetic pole pairs placed in the first movable element and the second movable element.

Furthermore, the present application is directed to provide a magnetic gear device capable of suppressing the eddy current by placing a connection position of the connecting rod by dividing circumferences of each of a plurality of circular rings of the holding member using the divisor of each number of the plurality of magnetic pole pairs placed in the first movable element and the second movable element.

According to an aspect of the present application, there is provided a magnetic gear device that includes a first movable element and a second movable element facing each other in which a plurality of magnetic pole pairs are each placed in a specific direction substantially at equal intervals; and a holding member that is placed between the first movable element and the second movable element and holds a plurality of magnetic materials in the specific direction substantially at equal intervals, wherein the number of the plurality of magnetic materials held by the holding member is a difference between or a total of the numbers of the plurality of magnetic pole pairs included in the first movable element and the second movable element, the holding member includes a plurality of holding portions that hold the plurality of magnetic materials, and connecting rods that are placed in the specific direction substantially at equal intervals and connect the plurality of holding portions, the plurality of holding portions face each other via the plurality of magnetic materials, and each number of the plurality of magnetic pole pairs included in the first movable element and the second movable element is set to have the number of connecting rods as a divisor.

In the present application, the first movable element, in which the plurality of magnetic pole pairs are placed in the specific direction substantially at equal intervals, and the second movable element, in which the plurality of magnetic pole pairs are placed in the specific direction substantially at equal intervals, are provided in the magnetic gear device so as to face each other at intervals. Furthermore, the magnetic gear device is provided with the holding member that holds the magnetic materials between the first movable element and the second movable element in the specific direction substantially at equal intervals. The number Ns of the magnetic materials is a difference (Pl–Ph) between the number Ph of the magnetic pole pairs included in the first movable element and the number Pl of the magnetic pole pairs included in the second movable element or a total (Ph+Pl) thereof. The gear ratio between the first movable element and the second movable element of the magnetic gear device is Ph/Pl. The holding member includes the plurality of holding portions facing each other. The plurality of holding portions hold the plurality of magnetic materials between the facing holding portions. Furthermore, the plurality of holding portions are connected to each other by the plurality of connecting rods placed in the specific direction substantially at equal intervals. The magnetic materials are placed in each of opening portions surrounded by a facing part of the holding portions and the connecting rod. The numbers Ph and Pl of the plurality of magnetic pole pairs placed in the first movable element and the second movable element have the number of connecting rods as a divisor. Thereby, the alternating magnetic field intersecting with each opening portion includes each harmonic component having an integer multiple of each period of a $Ph^{th}$ harmonic component, an $(Ns-Ph)^{th}$ harmonic component and an $(Ns+Ph)^{th}$ harmonic component in the specific direction. Accordingly, the eddy current does not flow through the closed loop constituted by a facing part of the holding portion forming the peripheries of each opening portion and the connecting rod.

According to another aspect of the present application, there is provided a magnetic gear device that includes a first movable element and a second movable element facing each other in which a plurality of magnetic pole pairs are each placed in a specific direction substantially at equal intervals; and a holding member that is placed between the first movable element and the second movable element and holds a plurality of magnetic materials in the specific direction substantially at equal intervals, wherein the number of the plurality of magnetic materials held by the holding member is a difference between or a total of the numbers of the plurality of magnetic pole pairs included in the first movable element and the second movable element, the holding member includes a plurality of holding portions that hold the plurality of magnetic materials, and connecting rods that are placed in the specific direction substantially at equal intervals and connect the plurality of holding portions, the plurality of holding portions face each other via the plurality of magnetic materials, and the number of connecting rods is a divisor of each number of the plurality of magnetic pole pairs included in the first movable element and the second movable element.

In the present application, the number of connecting rods is the divisor of each number of the plurality of magnetic pole pairs placed in the first movable element and the second movable element. In this case, the alternating magnetic field intersecting with each opening portion of the holding member includes each harmonic component having an integer multiple of each period of the $Ph^{th}$ harmonic component, the $(Ns-Ph)^{th}$ harmonic component and the $(Ns+Ph)^{th}$ harmonic component in the specific direction. Thereby, the alternating magnetic field intersecting with each opening portion of the holding member constantly includes each harmonic component having an integer multiple of each period of the $Ph^{th}$ harmonic component, the $(Ns-Ph)^{th}$ harmonic component and the $(Ns+Ph)^{th}$ harmonic component in the specific direction. Moreover, the eddy current does not flow through the closed loop constituted by a facing part of the holding portion forming the peripheries of each opening portion and the connecting rod.

In the magnetic gear device according to the aspect of the present application, the first movable element and the second movable element are cylinders, the plurality of magnetic pole pairs are placed on an outer peripheral surface of the first movable element in a circumferential direction, the second movable element has an inner peripheral surface facing the outer peripheral surface of the first movable element, the plurality of magnetic pole pairs are placed on the inner peripheral surface in the circumferential direction, the specific direction is the circumferential direction of the cylinder, and the holding portions are a plurality of circular rings that hold the plurality of magnetic materials between facing portions in the circumferential direction.

In the present application, as the first movable element and the second movable element, the cylindrical internal rotor and the external rotor into which the internal rotor is fitted at an interval are included. On each of the outer peripheral surface of the internal rotor and the inner peripheral surface of the external rotor, the plurality of magnetic pole pairs are placed in the circumferential direction. The holding member is inserted between the internal rotor and the external rotor. The holding member includes circular rings facing each other, and holds the plurality of magnetic materials in the circumferential direction between the facing circular rings.

According to still another aspect of the present application, there is provided a magnetic gear device that includes a first cylindrical movable element in which a plurality of magnetic pole pairs are placed on an outer peripheral side in a circumferential direction substantially at equal intervals; a second movable element to which the first movable element is fitted on an inner peripheral side at an interval and in which a plurality of magnetic pole pairs are placed on the inner peripheral side in the circumferential direction substantially at equal intervals; and a holding member that is placed between the first movable element and the second movable element and holds a plurality of magnetic materials in the circumferential direction, wherein the number of the plurality of magnetic materials held by the holding member is a difference between or a total of the numbers of the plurality of magnetic pole pairs included in the first movable element and the second movable element, the holding member includes a plurality of circular rings that hold the plurality of magnetic materials and face each other via the plurality of magnetic materials, and a connecting rod that connects connection positions placed in the circumferential direction of each of the plurality of circular rings, in a facing direction of the plurality of circular rings, and the connection positions are selected and placed from divided positions obtained by dividing circumferences of each of the plurality of circular rings substantially at equal intervals, by the use of a divisor of each number of the plurality of magnetic pole pairs included in the first movable element and the second movable element.

In the present application, the circumferences of each circular ring included in the holding member are divided using the divisor of each number of the plurality of magnetic pole pairs placed in the first movable element and the second movable element. Moreover, the connection position is selected from the plurality of divided positions, and the respective connection positions are connected by the connecting rod between the facing pairs. As a result, the alternating magnetic field intersecting with each opening portion of the holding member constantly includes each harmonic component having the integer multiple of each period of the $Ph^{th}$ harmonic component, the $(Ns-Ph)^{th}$ harmonic component and the $(Ns+Ph)^{th}$ harmonic component in the circumferential direction. Moreover, the eddy current does not flow through the closed loop constituted by a facing part of the holding portion forming the periphery of each opening portion and the connecting rod.

According to still another aspect of the present application, there is provided a holding member holding a plurality of magnetic materials between a first movable element and a second movable element facing each other in which a plurality of magnetic pole pairs are placed in a specific direction substantially at equal intervals, the holding member including a plurality of holding portions configured to hold the plurality of magnetic materials in the specific direction substantially at equal intervals; and connecting rods placed in the specific direction substantially at equal intervals to connect the plurality of holding portions, wherein the plurality of holding portions face each other via the plurality of magnetic materials, and the number of connecting rods is a divisor of each number of the plurality of magnetic pole pairs included in the first movable element and the second movable element.

In the present application, the holding member is inserted between the first movable element and the second movable element. The number of connecting rods included in the holding member is a divisor of each number of the plurality of magnetic pole pairs placed in the first movable element and the second movable element. As a result, the alternating magnetic field intersecting with each opening portion of the holding member constantly includes each harmonic component having the integer multiple of each period of the $Ph^{th}$ harmonic component, the $(Ns-Ph)^{th}$ harmonic component and the $(Ns+Ph)^{th}$ harmonic component in the specific direction. Accordingly, the eddy current does not flow through the closed loop constituted by a facing part of the holding portion forming the peripheries of each opening portion and the connecting rod.

According to still another aspect of the present application, there is provided a magnetic gear device in which the first movable element and the second movable element form a disk shape and are oppositely placed, the plurality of magnetic pole pairs are radially placed in each of the first movable element and the second movable element, the specific direction is a circumferential direction of a disk, and the holding portions are constituted by a plurality of concentric circular ring bodies holding the plurality of magnetic materials.

In the present application, as the first movable element and the second movable element, a lower disk-like rotor and an upper rotor facing the lower rotor at an interval are included. On each of an upper surface of the lower rotor and a lower surface of the upper rotor, a plurality of magnetic pole pairs are radially placed. The holding member is inserted between the lower rotor and the upper rotor. The holding member includes concentric circular ring bodies facing in a radial direction, and radially holds the plurality of magnetic materials between the facing circular ring bodies.

According to still another aspect of the present application, there is provided a magnetic gear device that includes a first disk-like movable element in which a plurality of magnetic pole pairs are radially placed substantially at equal intervals; a second disk-like movable element facing the first movable element at an interval in which a plurality of magnetic pole pairs are radially placed substantially at equal intervals; and a holding member that is placed between the first movable element and the second movable element and radially holds a plurality of magnetic materials, wherein the number of the plurality of magnetic materials held by the holding member is a difference between or a total of the numbers of the plurality of magnetic pole pairs included in the first movable element and the second movable element, the holding member includes a plurality of concentric circular ring bodies that hold the plurality of magnetic materials and face each other in a radial direction via the plurality of magnetic materials, and a connecting rod that connects the plurality of circular ring bodies in the radial direction, and the connecting rod connects a part or all of positions in which each of the plurality of circular ring bodies is divided in a circumferential direction substantially at equal intervals, by the use of a divisor of each number of the plurality of magnetic pole pairs included in the first movable element and the second movable element.

In the present application, among the positions in which each circular ring body included in the holding member is divided in the circumferential direction using the divisor of each number of the plurality of magnetic pole pairs placed in the first movable element and the second movable element, the selected part or all is connected by the connecting rod in the radial direction. As a result, the alternating magnetic field intersecting with each opening portion of the holding member constantly includes each harmonic component having the integer multiple of each period of the $Ph^{th}$ harmonic component, the $(Ns-Ph)^{th}$ harmonic component and the $(Ns+Ph)^{th}$ harmonic component in the circumferential direction. Moreover, the eddy current does not flow through the closed loop constituted by a facing part of the circular ring body forming the periphery of each opening portion and the connecting rod.

According to still another aspect of the present application, there is provided a magnetic gear device that includes a first rectangular plate-like movable element in which a plurality of magnetic pole pairs are placed in a longitudinal direction substantially at equal intervals; a second rectangular plate-like movable element separated from and facing the first movable element in which a plurality of magnetic pole pairs are placed in the longitudinal direction substantially at equal interval; and a holding member that is placed between the first movable element and the second movable element and holds a plurality of magnetic materials in the longitudinal direction, wherein the number per unit length in the longitudinal direction of the plurality of magnetic materials held by the holding member is a difference between or a total of the numbers per unit length of the plurality of magnetic pole pairs included in the first movable element and the second movable element, the holding member includes a plurality of holding rods that hold the plurality of magnetic materials, face each other via the plurality of magnetic materials, and substantially mate the longitudinal direction with the longitudinal direction of the first movable element and the second movable element, and a connecting rod that connects the plurality of connecting rods in a facing direction, the connecting rod connects a part or all of positions in which each portion of the plurality of holding rods per the unit length is divided in the longitudinal direction substantially at equal intervals, by the use of a divisor of each number per the unit length of the plurality of magnetic pole pairs included in the first movable element and the second movable element.

In the present application, as the first movable element and the second movable element, a rectangular lower plate, and a rectangular upper plate facing the lower plate at an interval are included. On each of an upper surface of the lower plate and a lower surface of the upper plate, a plurality of magnetic pole pairs are placed in the longitudinal direction. The holding member is inserted between the lower plate and the upper plate. The holding member includes holding rods extending and facing in the longitudinal direction, and holds the plurality of magnetic materials between the facing holding rods in the longitudinal direction. The connecting rod included in the holding member connects a part or all of the positions in which each portion of the holding rod per unit length is divided, using the divisor of each number per unit length in the longitudinal direction of the plurality of magnetic pole pairs placed in the lower plate and the upper plate. As a result, the alternating magnetic field intersecting with each opening portion of the holding member constantly includes each harmonic component having the integer multiple of each period of the $Ph^{th}$ harmonic component, the $(Ns-Ph)^{th}$ harmonic component and the $(Ns+Ph)^{th}$ harmonic component in the longitudinal direction. Moreover, the eddy current does not flow through the closed loop constituted by a facing part of the holding rod forming the periphery of each opening portion and the connecting rod.

According to still another aspect of the present application, there is provided a magnetic gear device that includes a first cylindrical movable element in which a plurality of magnetic pole pairs are placed on an outer peripheral side in a cylindrical axial direction substantially at equal intervals; a second cylindrical movable element into which the first movable element is fitted on an inner peripheral side at an interval and in which a plurality of magnetic pole pairs are placed on the inner peripheral side in the cylindrical axial direction substantially at equal intervals; and a holding member that is placed between the first movable element and the second movable element and holds a plurality of magnetic materials in the cylindrical axial direction, wherein the number per unit length in the longitudinal direction of the plurality of magnetic materials held by the holding member is a difference between or a total of the numbers per unit length of the plurality of magnetic pole pairs included in the first movable element and the second movable element, the holding member includes a plurality of holding rods that hold the plurality of magnetic materials, face each other via the plurality of magnetic materials, and substantially mate the longitudinal direction with the cylindrical axial direction, and a plurality of connection circular ring bodies that connect each of the plurality of holding rods, and the plurality of connection circular ring bodies connect a part or all of positions in which each portion of the plurality of holding rods per the unit length is divided in the longitudinal direction substantially at equal intervals, by the use of a divisor of each number per unit length of the plurality of magnetic pole pairs included in the first movable element and the second movable element.

In the present application, as the first movable element and the second movable element, a cylindrical internal column, and a cylindrical external column to which the internal column is fitted at an interval are included. On each of an outer peripheral surface of the internal column and an inner peripheral surface of the external column, a plurality of magnetic pole pairs are placed in the cylindrical axial direction. The holding member is inserted between the internal column and the external column. The holding member includes holding rods extending and facing in the longitudinal direction, and holds the plurality of magnetic materials between the facing holding rods in the cylindrical axial direction. The connection circular ring bodies connect a part or all of the positions in which the holding rods included in the holding member are divided, using the divisor of each number per unit length in the cylindrical axial direction of the plurality of magnetic pole pairs placed in the internal column and the external column. As a result, the alternating magnetic field intersecting with each opening portion of the holding member constantly includes each harmonic component having the integer multiple of each period of the $Ph^{th}$ harmonic component, the $(Ns-Ph)^{th}$ harmonic component and the $(Ns+Ph)^{th}$ harmonic component in the cylindrical axial direction. Moreover, the eddy current does not flow through the closed loop constituted by a facing part of the holding rod forming the periphery of each opening portion and the connection circular ring body.

In the magnetic gear device according to the aspect of the present application, the holding member can be moved.

In the present application, a relative rotational speed or a relative movement speed of the second movable element relative to the first movable element is changed by turning or moving the holding member.

In the magnetic gear device according to the aspect of the present application, any one of the first movable element and the second movable element can be immobilized.

In the present application, when the first movable element is immobilized, the second movable element rotates or moves along with the rotation or the movement of the holding member. When the second movable element is immobilized, the first movable element rotates or moves along with the rotation or the movement of the holding member.

According to an aspect of the device and the member, each number of the plurality of magnetic pole pairs placed in the first movable element and the second movable element has the number of the plurality of connecting rods included in the holding member as a divisor, and thus the eddy current loss can be suppressed.

Furthermore, according to an aspect of the device and the member, by setting the number of the plurality of connecting rods included in the holding member to the divisor of each number of the plurality of magnetic pole pairs included in the first movable element and the second movable element, the eddy current loss can be suppressed.

Furthermore, according to an aspect of the device, by placing the connection position of the connecting rod by dividing the circumferences of the plurality of circular rings included in the holding member using the divisor of each number of the plurality of magnetic pole pairs placed in the first movable element and the second movable element, the eddy current can be suppressed.

The above and further objects and features will more fully be apparent from the following detailed description with accompanying drawings.

BRIEF DESCRIPTION OF THE DRAWINGS

FIG. 4 is a graph that shows periods of each harmonic component included in an alternating magnetic field intersecting with an opening portion.

DETAILED DESCRIPTION

First Embodiment

Hereinafter, embodiments will be specifically described with reference to the accompanying drawings. A magnetic gear device according to the present application is a rotary type such as a cylindrical rotary type or a disk rotary type, a linear type such as a flat plate linear type or a cylindrical linear type, or the like. The rotary type magnetic gear device is configured so that a ratio of the number of revolutions of a second movable element relative to that of a first movable element has a predetermined gear ratio. Furthermore, the liner type magnetic gear device is configured so that an amount of movement of the second movable element relative to that of the first movable element has a predetermined gear ratio. The magnetic gear device is used for a movable apparatus as a non-contact type gear device that has little abrasion and noise and is easily maintained. For example, when used for a wind power generator as a movable apparatus, the magnetic gear device converts the number of revolutions of blades of a windmill so as to coincide with a commercial frequency. The present embodiment will be described with reference to an example of the cylindrical rotary type magnetic gear.

Figure 1:
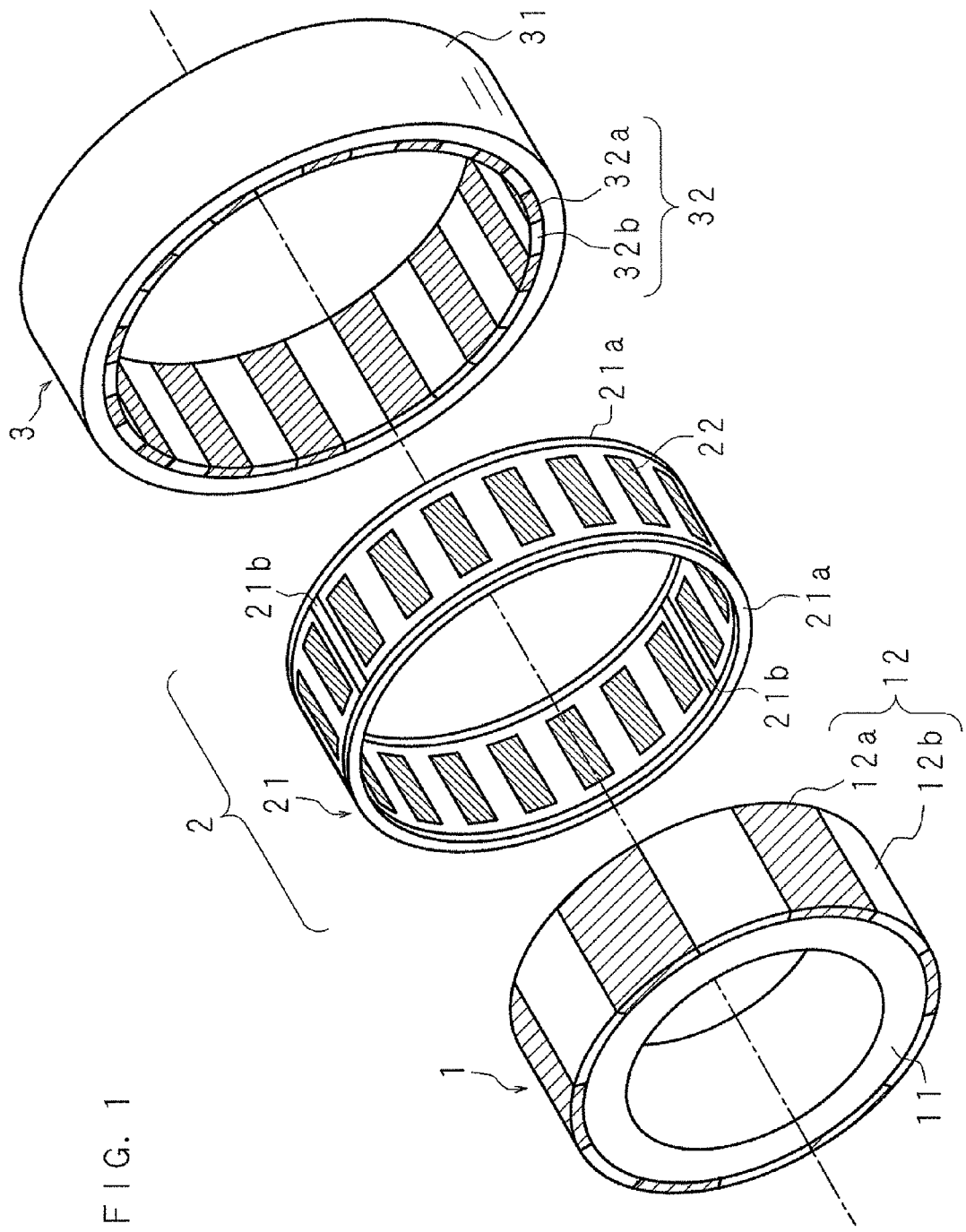
FIG. 1 is a schematic assembly view that shows an example of a cylindrical rotary type magnetic gear device.
Figure 2:
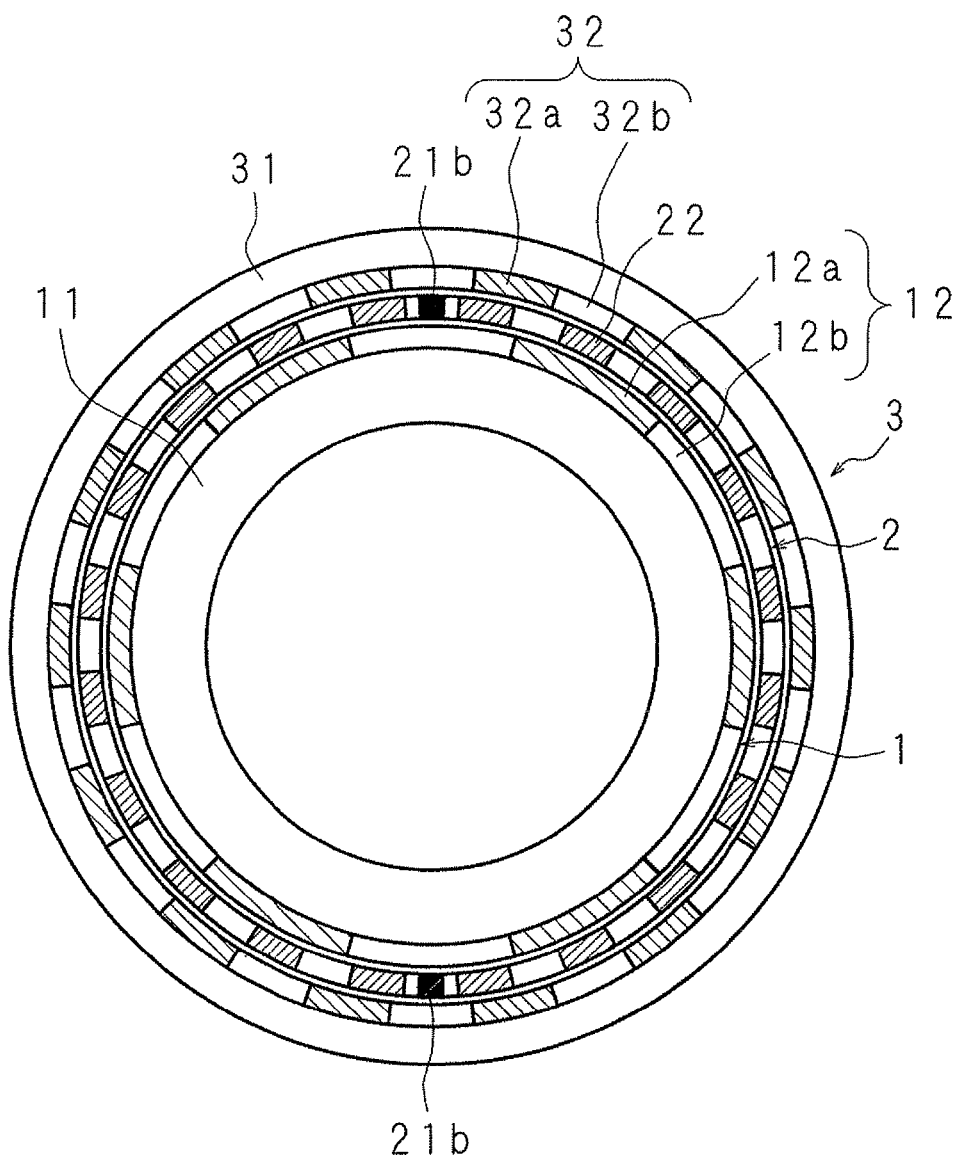
FIG. 2 is a schematic cross-sectional view that shows an example of the cylindrical rotary type magnetic gear device.

FIGS. 1 and 2 are a schematic assembly view and a schematic cross-sectional view that show an example of the cylindrical rotary type magnetic gear device. FIG. 2 shows a cross section perpendicular to a rotation axis of the cylindrical rotary type magnetic gear device. The cylindrical rotary type magnetic gear device includes a cylindrical internal rotor 1, a cylindrical external rotor 3 into which the internal rotor 1 is fitted at an interval, and an intermediate yoke 2 fitted between the internal rotor 1 and the external rotor 3 at an interval. The internal rotor 1 has a cylinder 11 formed of a magnetic material, and six magnetic pole pairs 12 each of which includes a magnet 12a with N pole at outer side and a magnet 12b with S pole at outer side magnetized in a thickness direction are placed on the outer peripheral surface of the cylinder 11 in a circumferential direction.

Furthermore, the external rotor 3 has a cylinder 31 formed of the magnetic material, and fourteen magnetic pole pairs 32 each of which includes a magnet 32a with N pole at inner side and a magnet 32b with S pole at inner side magnetized in a thickness direction are placed on the inner peripheral surface of the cylinder 31 in the circumferential direction. Herein, the magnets being magnetized in the thickness direction means that the outer peripheral surface side and the inner peripheral surface side are magnetized so as to be different poles. For example, the magnet 12a is configured so that the outer peripheral surface side and the inner peripheral surface side are magnetized to the N pole and the S pole, respectively, and the magnet 12b is configured so that the outer peripheral surface side and the inner peripheral surface side are magnetized to the S pole and the N pole, respectively.

When the external rotor 3 rotates, the internal rotor 1 rotates by the magnetic interaction between the magnetic pole pairs 12 and 32 included in each of the internal rotor 1 and the external rotor 3. In this case, the internal rotor 1 having fewer magnetic poles than the external rotor 3 rotates at a higher number of revolutions than the external rotor 3 and in a direction opposite to the rotary direction of the external rotor 3. A ratio Ph/Pl of the number Ph of magnetic pole pairs placed in the internal rotor 1 and the number Pl of magnetic pole pairs placed in the external rotor 3 is a gear ratio n of the internal rotor 1 relative to the external rotor 3. Moreover, when the external rotor 3 rotates once to the left, the internal rotor 1 rotates 1/n times to the right. In an example of the magnetic gear device shown in FIG. 1, the gear ratio n is 3/7, and for example, when the external rotor 3 rotates once to the left, the internal rotor 1 rotates 7/3 times to the right. The intermediate yoke 2 holds twenty ferromagnetic magnetic materials 22 that is a total of the number 6 and 14 of the magnetic pole pairs included in each of the internal rotor 1 and the external rotor 3 in the circumferential direction at equal intervals. For example, as the magnetic materials 22, a soft magnetic material constituted by a magnetic metal, a plurality of superimposed magnetic plates, a green compact of magnetic powders or the like may be used.

Figure 3:
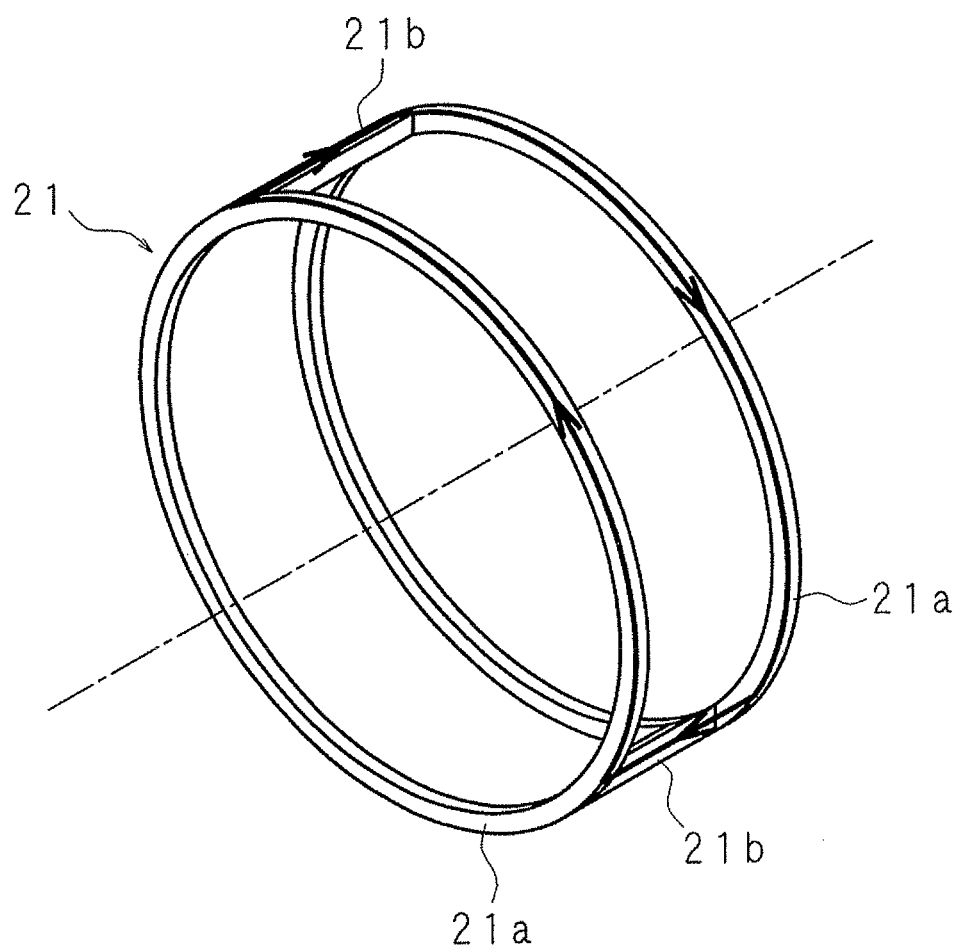
FIG. 3 is schematic perspective view that shows an example of a closed loop.

FIG. 3 is a schematic perspective view that shows an example of a closed loop. Thick lines including arrows of the drawings show one closed loop of the two closed loops formed on the holding member 21. The holding member 21 has a pair of circular rings (holding portions) 21a and 21a facing each other along a rotation axis of the internal rotor 1 and the external rotor 3, and two connecting rods 21b and 21b that are placed in the circumferential direction substantially at equal intervals and connect the pair of circular rings 21a and 21a in a facing direction. The number 2 of connecting rods 21b is a divisor of the number 6 of magnetic pole pairs 12 included in the internal rotor 1, the number 14 of magnetic pole pairs 32 included in the external rotor 3 and the number 20 of magnetic materials 22 included in the intermediate yoke 2.

On the holding member 21, two closed loops formed by a facing part of each of the circular rings 21a and 21a and the connecting rods 21b and 21b are formed. Ten magnetic materials 22 are placed in each opening portion surrounded by a closed loop. For example, for each circular ring 21a and each connecting rod 21b, an aluminum alloy, a magnesium alloy, a nonmagnetic stainless alloy, or a nonmagnetic metal such as gold, silver or copper may be used. For example, each circular ring 21a may be a part of a housing that stores the magnetic gear device, and may be integrated with a shaft connected with the magnetic gear device. A plurality of magnetic materials 22 may be held using the facing disks instead of the circular rings 21a and 21a. The alternating magnetic field generated by the magnetic pole pairs 12 and 32 placed in the internal rotor 1 and the external rotor 3 intersects with each opening portion of the holding member 21 in the radial direction of the intermediate yoke 2. Moreover, the alternating magnetic field intersects with the magnetic material 22 placed in each opening portion.

FIG. 4 is a graph that shows a period of each harmonic component included in the alternating magnetic field. In the case of the cylindrical rotary type magnetic gear device in which the number Ns of magnetic materials placed in the intermediate yoke is a difference (Pl−Ph) between the number Ph of magnetic pole pairs included in the internal rotor and the number Pl of magnetic pole pairs included in the external rotor or a total (Ph+Pl) thereof, it is known that the alternating magnetic field includes the $Ph^{th}$ harmonic component, the $(Ns-Ph)^{th}$ harmonic component and the $(Ns+Ph)^{th}$ harmonic component (see Non-Patent Document 2). The harmonic components $\phi1$, $\phi2$, and $\phi3$ shown in FIG. 4 are respectively the $Ph^{th}$ harmonic component, the $(Ns-Ph)^{th}$ harmonic component, and the $(Ns+Ph)^{th}$ harmonic component.

A vertical axis of each graph shows amplitude of each harmonic component. A horizontal axis thereof shows a position on an opening surface of an opening portion of the holding member 21 using a period of each harmonic component in a circumferential direction of the intermediate yoke 2. In an example of the magnetic gear device shown in FIGS. 1 and 2, Ns=20, Ph=6, Pl=14, and the number 20 of magnetic materials 22 placed in the intermediate yoke 2 is a total of each number of magnetic pole pairs 6 and 14 placed in the internal rotor 1 and the external rotor 3. In this case, the alternating magnetic field intersecting with the opening portion surrounded by the closed loop shown in FIG. 3 includes the sixth harmonic component, the fourteenth harmonic component, and the twenty-sixth harmonic component.

As shown in FIG. 4, in an opening distance in the circumferential direction of the intermediate yoke 2 of each opening portion of the holding member 21, three periods of the sixth harmonic component, seven periods of the fourteenth harmonic component, and thirteen periods of the twenty-sixth harmonic component are included. That is, in the opening distance in the circumferential direction of the intermediate yoke 2 of the opening portion, the period of the integer multiple of each harmonic component is included. Accordingly, in the closed loop located in the periphery of each opening portion of the holding member 21, the eddy current due to the alternating magnetic field is not generated.

Although a case in which the holding member 21 includes the two connecting rods 21b has been described, the invention is not limited thereto. For example, the number 1 serving as the divisor of the number 6 of magnetic pole pairs 12 included in the internal rotor 1, the number 14 of magnetic pole pairs 32 included in the external rotor 3, and the number 20 of magnetic materials 22 included in the intermediate yoke 2 may be the number of connecting rods 21b.

The magnetic gear device in which Ns=20, Ph=6 and Pl=14 merely shows an example, and the invention is not limited thereto. Next, a method of designing the magnetic gear device of the present application having a predetermined gear ratio will be described. The number Ph of magnetic pole pairs 12 placed in the internal rotor 1, and the number Pl of magnetic pole pairs 32 placed in the external rotor 3 are calculated so that Ph/Pl becomes a predetermined gear ratio using the known technology, and Ph+Pl is calculated as the number Ns of magnetic materials 22 placed in the intermediate yoke 2. Next, the divisor of Ph, Pl and Ns is decided as the number of connecting rods 21b included in the holding member 21 by applying the example of the present application.

As a result, the magnetic gear device in which the eddy current is not generated in the closed loop formed on the holding member 21 is designed. For example, when the divisors of Ns, Ph, and Pl are 1 and 3, the number of connecting rods 21b included in the holding member 21 may be decided as either of one and three. Furthermore, although a case in which the holding member 21 includes the total number of decided connecting rods 21b has been described, the invention is not limited thereto. When the divisor of Ns, Ph and Pl is equal to or greater than 2, the peripheries of the facing paired holding members 21 are divided by the divisor, and, among the facing positions, the selected paired positions may be connected by the connecting rods 21b of the number smaller than the divisor.

In this case, the holding member 21 may not include the plurality of connecting rods 21b in the circumferential direction of the intermediate yoke 2 at equal intervals. For example, when the divisor of Ns, Ph and Pl is 5, the periphery of the facing holding member 21 is divided into five portions, and, among the five sets of facing paired positions, the three sets of facing paired positions having no equal intervals may be selected as the connection position and may be connected by three connecting rods 21b.

Next, a method of designing the magnetic gear device of the present application including a predetermined number of connecting rods 21b and having a predetermined gear ratio will be described. The number Ph of magnetic pole pairs 12 placed in the internal rotor 1 and the number Pl of magnetic pole pairs 32 placed in the external rotor 3 are calculated using the known technology in the related art, and Ph+Pl is calculated as the number Ns of magnetic materials 22 placed in the intermediate yoke 2. By applying the example of present application, when the calculated numbers Ph, Pl and Ns have a predetermined number of connecting rods 21b as a divisor, the number is decided as the calculated numbers Ph, Pl and Ns. Furthermore, when the calculated numbers Ph, Pl and Ns do not have a predetermined number of connecting rods 21b as a divisor, each number obtained by multiplying the calculated numbers Ph, Pl and Ns by the predetermined number of connecting rods 21b is decided as the numbers Ph, Pl and Ns.

Figure 5:
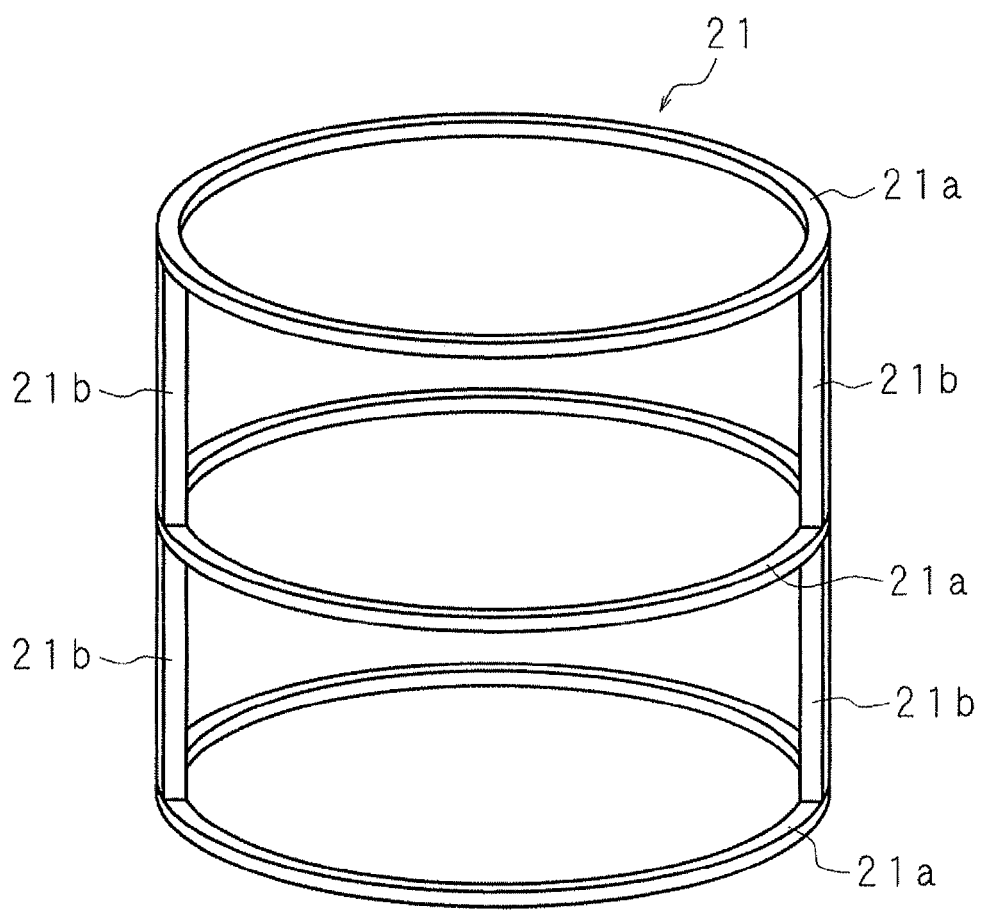
FIG. 5 is a schematic perspective view that shows another example of the holding member.

FIG. 5 is a schematic perspective view that shows another example of the holding member 21. Although a case in which the holding member 21 includes a pair of facing circular rings 21a and 21a has been described, not being limited thereto, three or more facing circular rings 21a may be included. In the example shown in FIG. 5, three circular rings 21a are coaxially placed at intervals. The adjacent circular rings 21a and 21a are connected by the connecting rods 21b and 21b. In this case, in the holding member 21, four closed loops constituted by the facing parts of the adjacent circular rings 21a and 21a and the connecting rods 21b and 21b connected to the parts are formed on the holding member 21.

The holding member 21 has four opening portions surrounded by each closed loop. Since the period of the integer multiple of each harmonic component is included in the opening distance in the circumferential direction of the intermediate yoke 2 of each opening portion, the eddy current does not flow through each closed loop. Furthermore, even when the intermediate yoke 2 rotates, since the period of the integer multiple of each harmonic component is included in the opening distance in the circumferential direction of the intermediate yoke 2 of each opening portion, the eddy current does not flow through each closed loop.

Figure 6:
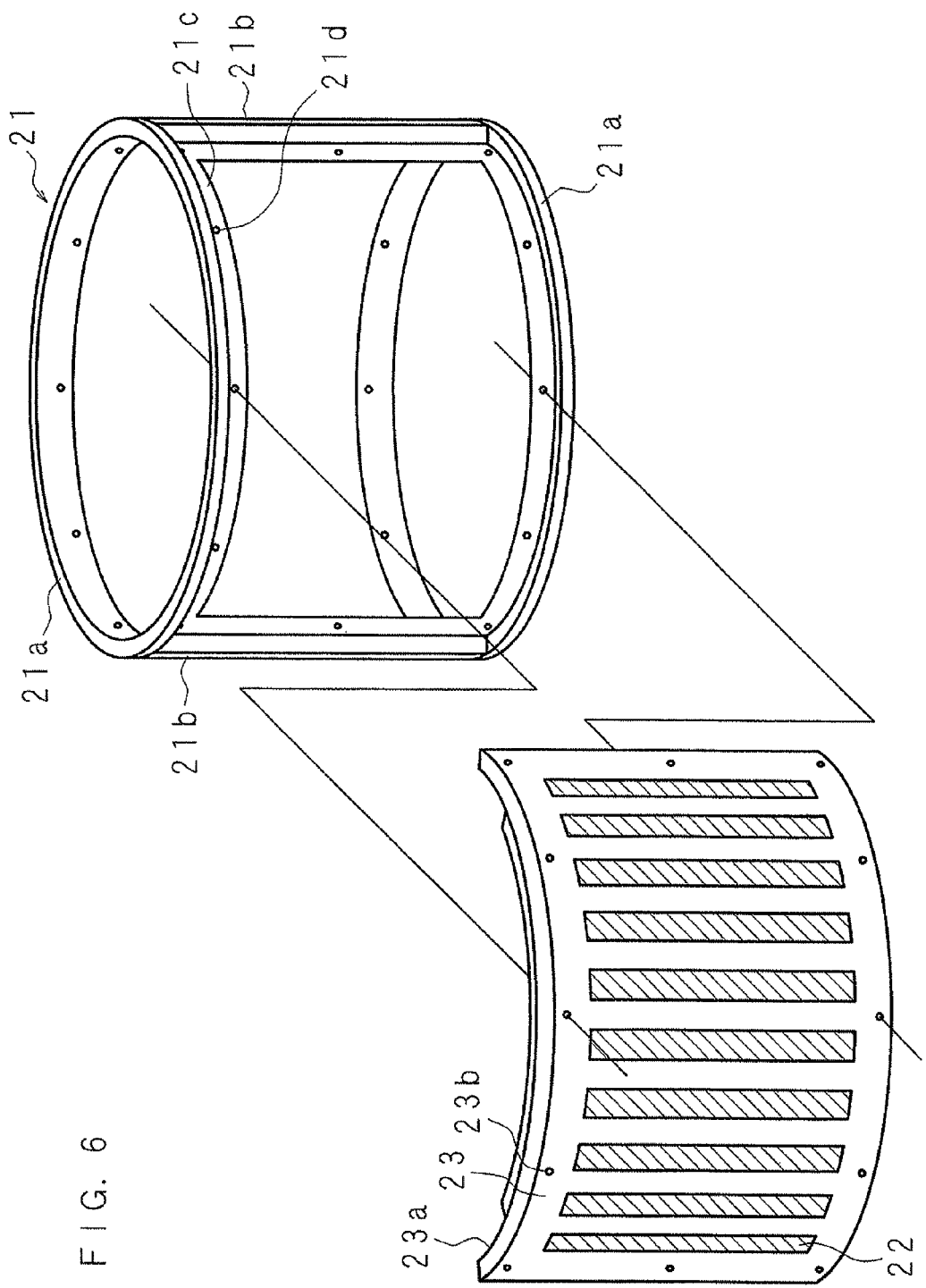
FIG. 6 is a schematic assembly view that shows an example of an attaching method of a magnetic material.

FIG. 6 is a schematic assembly view that shows an example of a method of attaching the magnetic material 22. The holding member 21 may hold the magnetic material 22 by fitting the plate with the magnetic material 22 embedded therein to the opening portion of the holding member 21. In the example shown in FIG. 6, a plurality of magnetic materials 22 are embedded, and the nonmagnetic and non-conducive plate 23 is fitted to the opening portion of the holding member 21. In the periphery of the plate 23, a flange portion 23a provided with a plurality of hole portions 23b is included. Furthermore, in the inner periphery of the opening portion of the holding member 21, a flange portion 21c coming into contact with the flange portion 23a of the plate 23 and provided with a plurality of hole portions 21d is included. The plate 23 fitted to each opening portion of the holding member 21 is attached to the holding member 21 using a rivet, a screw or the like penetrating through the respective hole portions 23b and 21d.

The attachment of the magnetic material 22 to the holding member 21 may be performed by screwing or bonding both ends of the magnetic material 22 to the peripheral portion of the circular ring 21a. Furthermore, in this case, by attaching both ends of the magnetic material 22 to the peripheral portion of the circular ring 21a via a spacer made of a nonmetal, rotary torque applied to the magnetic material 22 may be absorbed.

Furthermore, in the example, although the magnetic pole pair has been constituted by the two magnets, the invention is not limited to this configuration. One magnet may be magnetized by the two poles of N and S in the rotary direction to form one magnet pole pair. Furthermore, similarly, the magnet may be magnetized as N S N S to form two magnet poles. In the example, although an arch-shaped magnet has been described, as long as the configuration of the present invention can be obtained, it is possible to use circular ring-shaped magnets radially arranged in the internal and external rotors.

In the present embodiment, the alternating magnetic field intersecting with the opening portion surrounded by the closed loop formed on the holding member 21 includes each harmonic component having the integer multiple of each period in the circumferential direction. As a result, the eddy current due to the alternating magnetic field does not flow through the closed loop formed on the holding member 21, and the eddy current loss can be suppressed. Since the eddy current does not flow through the closed loop, it is possible to save the labor of the electrical insulation using a polymeric material or the like so that the closed loop is not formed in the periphery of the opening portion in the holding member 21.

Furthermore, since the eddy current does not flow through the closed loop, when using the nonmagnetic and conductive metal material in the circular ring 21a and the connecting rod 21b, it is possible to save the labor of insulating a coupling portion between the circular ring 21a and the connecting rod 21b so that the conductive closed loop is not formed in the periphery of the opening portion in the holding member 21. Furthermore, it is possible to manufacture the holding member 21 using the nonmagnetic metal material and obtain the holding member 21 having high mechanical strength. Furthermore, it is possible to obtain the holding member 21 having high dimensional accuracy by the use of the metal material having high workability.

In the embodiment, when changing the number of connecting rods 21b of the magnetic gear device having a predetermined gear ratio, each number of magnetic pole pairs placed in the internal rotor 1 and the external rotor 3 and the number of magnetic materials 22 held in the intermediate yoke are each changed to the number calculated by multiplying each number by the number of connecting rods 21b. As a result, it is possible to increase the mechanical strength of the holding member 21 of the magnetic gear device having a predetermined gear ratio while suppressing the eddy current loss.

The magnetic gear device shown in the embodiment may change the relative rotational speed of the external rotor 3 relative to the internal rotor 1 by turning the intermediate yoke 2. For example, by constantly maintaining the number of revolutions of the internal rotor 1 and changing the number of revolutions of the intermediate yoke 2, it is possible to change the number of revolutions of the external rotor 3 rotating in an opposite direction of the rotary direction of the internal rotor 1. Even when the holding member 21 rotates along with the rotation of the intermediate yoke 2, the alternating magnetic field intersecting with the opening portion surrounded by the closed loop formed on the holding member 21 includes each harmonic component having the integer multiple of each period in the circumferential direction. As a result, the eddy current due to the alternating magnetic field does not flow through the closed loop formed on the holding member 21, and the eddy current loss can be suppressed.

According to the magnetic gear device related to the present application, it is possible to reduce the interval between the inner peripheral surface of the intermediate yoke 2 and the outer peripheral surface of the internal rotor 1, and the interval between the outer peripheral surface of the intermediate yoke 2 and the inner peripheral surface of the external rotor 3, by the use of the intermediate yoke 2 having the holding member 21 with the magnetic material 22 placed in the opening portion. As a result, it is possible to improve the gear efficiency of the magnetic gear device.

Although a case in which the internal rotor 1 rotates along with the rotation of the external rotor 3 has been described, not being limited thereto, the external rotor 3 may be immobilized, and the internal rotor 1 may rotate along with the rotation of the intermediate yoke 2. In this case, when the intermediate yoke 2 rotates once to the right, the internal rotor 1 rotates to the right (1+1/n) times coinciding with the rotary direction of the intermediate yoke 2. In the example of the magnetic gear device having the gear ratio of 3/7 shown in FIG. 1, for example, when the intermediate yoke 2 rotates once to the right side, the internal rotor 1 rotates 10/3 times to the right side.

Furthermore, the internal rotor 1 may be immobilized, and the external rotor 3 may rotate along with the rotation of the intermediate yoke 2. In this case, when the intermediate yoke 2 rotates (1+1/n) times to the left, the external rotor 3 rotates 1/n times to the left coinciding with the rotary direction of the intermediate yoke 2. In the example of the magnetic gear device having the gear ratio of 3/7 shown in FIG. 1, for example, when the intermediate yoke 2 rotates 10/3 times to the left, the external rotor 3 rotates 7/3 times to the left.

In the present embodiment, although the cylindrical rotary type magnetic gear device has been described, a disk rotary type magnetic gear device may be used without being limited thereto. The disk rotary type magnetic gear device is configured so that a first disk-like movable element with a plurality of magnetic pole pairs radially placed substantially at equal intervals and a second disk-like movable element with a plurality of magnetic pole pairs radially placed substantially at equal intervals coaxially face each other at an interval. Between the first movable element and the second movable element, a holding member of a disk configured to radially hold magnetic materials substantially at equal intervals is coaxially provided. The holding member includes a plurality of circular ring-like holding portions having different diameters placed on the inner peripheral side and the outer peripheral side and coaxially placed, and the plurality of holding portions hold the plurality of magnetic materials between the facing holding portions in the radial direction.

Furthermore, the plurality of holding portions are configured so that the facing holding portions in the radial direction are connected to each other by connecting rods radially placed substantially at equal intervals. The magnetic material is attached to each of the opening portions surrounded by a facing part of the holding portions and the connecting rod. In the disk-like magnetic gear device, by setting each number of the plurality of magnetic pole pairs included in the first movable element and the second movable element so that the number of connecting rods is included as the divisor, the eddy current loss can also be suppressed.

The magnetic gear device related to the present application may be a flat plate linear type magnetic gear device. The flat plate linear type magnetic gear device is configured so that a first flat plate-like movable element with a plurality of magnetic pole pairs placed in one direction substantially at equal intervals and a second flat plate-like movable element with a plurality of magnetic pole pairs placed in the one direction substantially at equal intervals face each other at an interval. Between the first movable element and the second movable element, a flat plate-like holding member configured to hold magnetic materials in the one direction substantially at equal intervals is provided. The holding member includes a plurality of holding portions extending in the one direction and facing each other and the plurality of holding portions hold the plurality of magnetic materials between the facing holding portions.

Furthermore, the plurality of holding portions are configured so that the facing holding portions are connected to each other by connecting rods placed in the one direction substantially at equal intervals. The magnetic material is attached to each of the opening portions surrounded by a facing part of the holding portions and the connecting rod. Even in the flat plate linear type magnetic gear device, by setting each number of the plurality of magnetic pole pairs included in the first movable element and the second movable element so that the number of connecting rods is included as the divisor, the eddy current loss can also be suppressed.

The magnetic gear device related to the present application may be a cylindrical linear type magnetic gear device. The cylindrical linear type magnetic gear device includes a first cylindrical movable element in which a plurality of magnetic pole pairs are placed on an outer peripheral surface in a central axial direction substantially at equal intervals, and a second cylindrical movable element into which the first movable element is fitted at an interval and in which a plurality of magnetic pole pairs are placed on an inner peripheral surface in the central axial direction substantially at equal intervals. Between the first movable element and the second movable element, a cylindrical holding member configured to hold magnetic materials in the central axial direction substantially at equal intervals is provided. The holding member includes a plurality of circular ring-like holding portions facing each other in the central axial direction, and the plurality of holding portions hold the plurality of magnetic materials placed in the central axial direction at equal intervals between the facing holding portions.

Furthermore, the plurality of holding portions are configured so that the facing holding portions in the central axial direction are connected to each other by connecting rods placed in the central axial direction substantially at equal intervals. The magnetic material is attached to each of the opening portions surrounded by a facing part of the holding portions and the connecting rod. Even in the cylindrical linear type magnetic gear device, by setting each number of the plurality of magnetic pole pairs included in the first movable element and the second movable element so that the number of connecting rods is included as the divisor, the eddy current loss can be suppressed.

Second Embodiment

Figure 7:
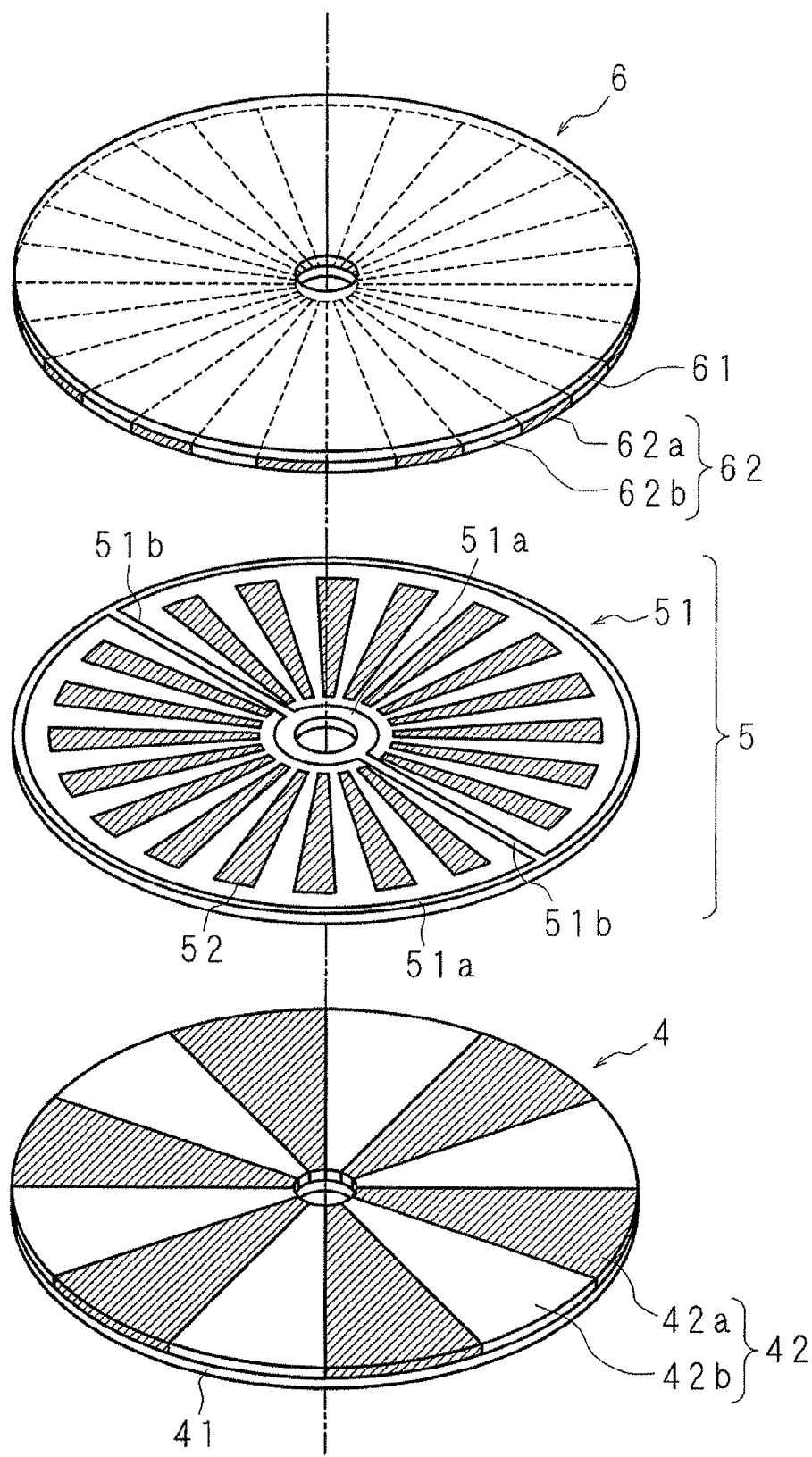
FIG. 7 is a schematic assembly view that shows an example of the disk rotary type magnetic gear device.

The second embodiment suppresses the eddy current loss of the disk rotary type magnetic gear device compared to the first embodiment that suppresses the eddy current loss of the cylindrical rotary type magnetic gear device. FIG. 7 is a schematic assembly view that shows an example of the disk rotary type magnetic gear device. The disk rotary type magnetic gear device includes a disk-like lower rotor 4, an upper rotor 6 placed coaxially with the lower rotor 4 at an interval, and a disk-like intermediate yoke 5 placed coaxially between the lower rotor 4 and the upper rotor 6 at an interval. The lower rotor 4 has a disk 41 formed of a magnetic material, and six magnetic pole pairs 42 each of which includes a magnet 42a with N pole at upper side and a magnet 42b with S pole at upper side magnetized in a thickness direction are radially placed on an upper surface of the disk 41.

Furthermore, the upper rotor 6 has a disk 61 formed of a magnetic material, and fourteen magnetic pole pairs 62 each of which includes a magnet 62a with N pole at lower side and a magnet 62b with S pole at lower side magnetized in a thickness direction are radially placed on a lower surface of the disk 61. Herein, the magnet being magnetized in the thickness direction means that the magnet is magnetized so that the upper side and the lower side are different poles. For example, the magnet 42a is configured so that the upper side and the lower side are magnetized to the N pole and the S pole, respectively, and the magnet 42b is configured so that the upper side and the lower side are magnetized to the S pole and the N pole, respectively.

When the upper rotor 6 rotates, the lower rotor 4 rotates by the magnetic interaction between the magnetic pole pairs 42 and 62 included in the lower rotor 4 and the upper rotor 6, respectively. In this case, the lower rotor 4 having fewer magnetic poles than the upper rotor 6 rotates in an opposite direction of the rotary direction of the upper rotor 6, at a higher number of revolutions than the upper rotor 6. The ratio Ph/Pl of the number Ph of magnetic pole pairs placed in the lower rotor 4 and the number Pl of magnetic pole pairs placed in the upper rotor 6 is a gear ratio of the lower rotor 4 relative to the upper rotor 6. In the example of the magnetic gear device shown in FIG. 7, the gear ratio is 3/7. The intermediate yoke 5 radially holds the twenty ferromagnetic magnetic materials 52 of the total of the numbers 6 and 14 of the magnetic pole pairs included in the lower rotor 4 and the upper rotor 6.

The holding member 51 has a pair of large diameter and small diameter circular rings (circular ring bodies and holding portions) 51a and 51a facing each other in the radial direction of the lower rotor 4 and the upper rotor 6. The small diameter circular ring 51a is located inside the large diameter circular ring 51a, and an outer peripheral surface of the small diameter circular ring 51a faces an inner peripheral surface of the large diameter circular ring 51a. Furthermore, the holding member 51 has two connecting rods 51b and 51b that are placed in the circumferential direction substantially at equal intervals and connect the pair of circular rings 51a and 51a in the facing direction. The number 2 of connecting rods 51b is a divisor of the number 6 of magnetic pole pairs 42 included in the lower rotor 4, the number 14 of magnetic pole pairs 62 included in the upper rotor 6, and the number 20 of magnetic materials 52 included in the intermediate yoke 5. As a result, the alternating magnetic field intersecting with each opening portion of the holding member 51 constantly includes each harmonic component having the integer multiple of each period of the $Ph^{th}$ harmonic component, the $(Ns-Ph)^{th}$ harmonic component and the $(Ns+Ph)^{th}$ harmonic component in the circumferential direction. Moreover, the eddy current does not flow through the closed loop constituted by the facing parts of the circular rings 51a and 51a forming the peripheries of each opening portion and the connecting rod 51b. In addition, twenty magnetic materials 52 are radially placed around the small diameter circular ring 51a.

The magnetic gear device shown in the present embodiment may change the relative rotational speed of the upper rotor 6 relative to the lower rotor 4 by turning the intermediate yoke 5. Furthermore, the upper rotor 6 may be immobilized and the lower rotor 4 may rotate along with the rotation of the intermediate yoke 5. In addition, the lower rotor 4 may be immobilized and the upper rotor 6 may rotate along with the rotation of the intermediate yoke 5.

Third Embodiment

Figure 8:
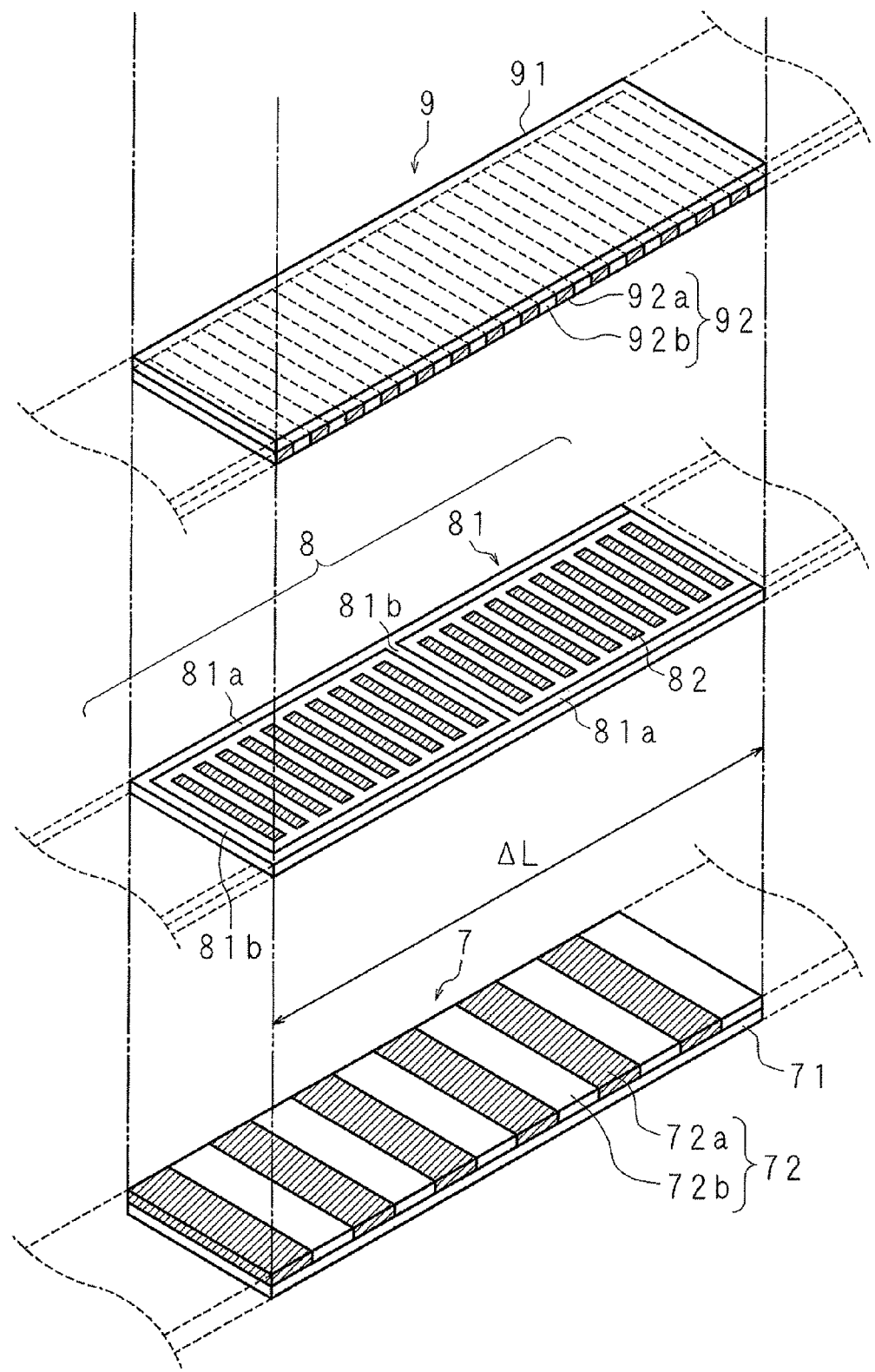
FIG. 8 is a schematic assembly view that shows an example of a flat plate linear type magnetic gear device.

The third embodiment suppresses the eddy current loss of the flat plate linear type magnetic gear device compared to the second embodiment that suppresses the eddy current loss of the disk rotary type magnetic gear device. FIG. 8 is a schematic assembly view that shows an example of a flat plate linear type magnetic gear device. Furthermore, FIG. 8 shows a part per unit length ΔL in the longitudinal direction of the flat plate linear type magnetic gear device extending in the longitudinal direction. The flat plate linear type magnetic gear device includes a rectangular plate-like lower plate 7, and a rectangular plate-like upper plate 9 that extends substantially parallel to the lower plate 7 and is placed at an interval. Side surfaces extending in the longitudinal direction of each of the lower plate 7 and the upper plate 9 are guided and supported by a guidance member (not shown), and the lower plate 7 and the upper plate 9 are freely moved in the longitudinal direction.

Furthermore, the flat plate linear type magnetic gear device includes a rectangular plate-like intermediate yoke 8 that extends substantially parallel to the lower plate 7 and the upper plate 9 and is placed between the lower plate 7 and the upper plate 9 at an interval. The lower plate 7 has a plate 71 formed of a magnetic material, and six magnetic pole pairs 72 each of which includes a magnet 72a with N pole at upper side and a magnet 72b with S pole at upper side magnetized in a thickness direction are placed on an upper surface of the plate 71 per unit length ΔL in the longitudinal direction. Furthermore, the upper plate 9 has a plate 91 formed of a magnetic material, and fourteen magnetic pole pairs 92 each of which includes a magnet 92a with N pole at lower side and a magnet 92b with S pole at lower side magnetized in a thickness direction are placed on a lower surface of the plate 91 per unit length ΔL in the longitudinal direction.

Herein, the magnet being magnetized in the thickness direction means that the magnet is magnetized so that the lower side and the upper side are different poles. For example, the magnet 72a is configured so that the upper side and the lower side are magnetized to the N pole and the S pole, respectively, and the magnet 72b is configured so that the upper side and the lower side are magnetized to the S pole and the N pole, respectively. When the upper plate 9 is linearly moved in the longitudinal direction, the lower plate 7 is moved in the longitudinal direction by the magnetic interaction between the magnetic pole pairs 72 and 92 included in the lower plate 7 and the upper plate 9. A ratio Ph/Pl between the number Ph per unit length ΔL of magnetic pole pairs placed in the lower plate 7 and the number Pl per unit length ΔL of magnetic pole pairs placed in the upper plate 9 is a gear ratio of the lower plate 7 relative to the upper plate 9.

In the example of the magnetic gear device shown in FIG. 8, the gear ratio is 3/7. The intermediate yoke 8 holds twenty ferromagnetic magnetic materials 82 of the total of the numbers 6 and 14 per unit length ΔL of magnetic pole pairs included in the lower plate 7 and the upper plate 9 per unit length ΔL in the longitudinal direction at equal intervals. The holding member 81 has a pair of holding rods (holding portions) 81a and 81a facing each other in the longitudinal direction of the lower plate 7 and the upper plate 9, and two connecting rods 81b per unit length ΔL that are placed in the longitudinal direction substantially at equal intervals and connect the pair of holding rods 81a and 81a in the facing direction.

The number 2 per unit length ΔL of connecting rods 81b is a divisor of the number 6 per unit length ΔL of magnetic pole pairs 72 included in the lower plate 7, the number 14 per unit length ΔL of magnetic pole pairs 92 included in the upper plate 9, and the number 20 per unit length ΔL of magnetic materials 82 included in the intermediate yoke 8. As a result, the alternating magnetic field intersecting with each opening portion of the holding member 81 constantly includes each harmonic component having the integer multiple of each period of the $Ph^{th}$ harmonic component, the $(Ns-Ph)^{th}$ harmonic component, and the $(Ns+Ph)^{th}$ harmonic component in the longitudinal direction. Moreover, the eddy current does not flow through the closed loop constituted by the facing parts of the holding rods 81a and 81a forming the peripheries of each opening portion and the connecting rod 81b.

The magnetic gear device shown in the present embodiment may change the relative movement speed of the upper plate 9 relative to the lower plate 7 by moving the intermediate yoke 8. Furthermore, the upper plate 9 may be immobilized and the lower plate 7 may be moved along with the movement of the intermediate yoke 8. In addition, the lower plate 7 may be immobilized and the upper plate 9 may be moved along with the movement of the intermediate yoke 8.

Fourth Embodiment

Figure 9:
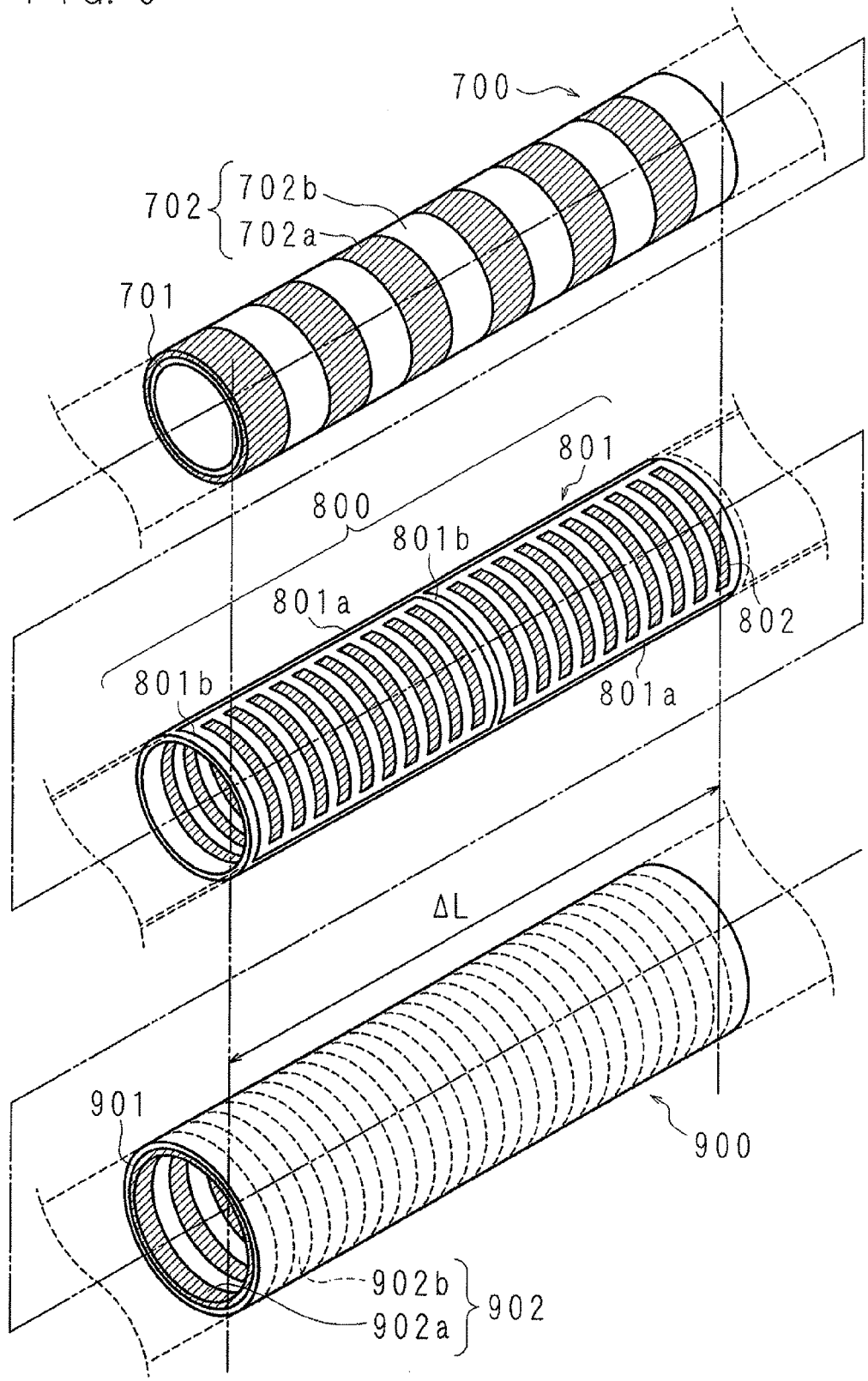
FIG. 9 is a schematic assembly view that shows an example of a cylindrical linear type magnetic gear device.
Figure 10:
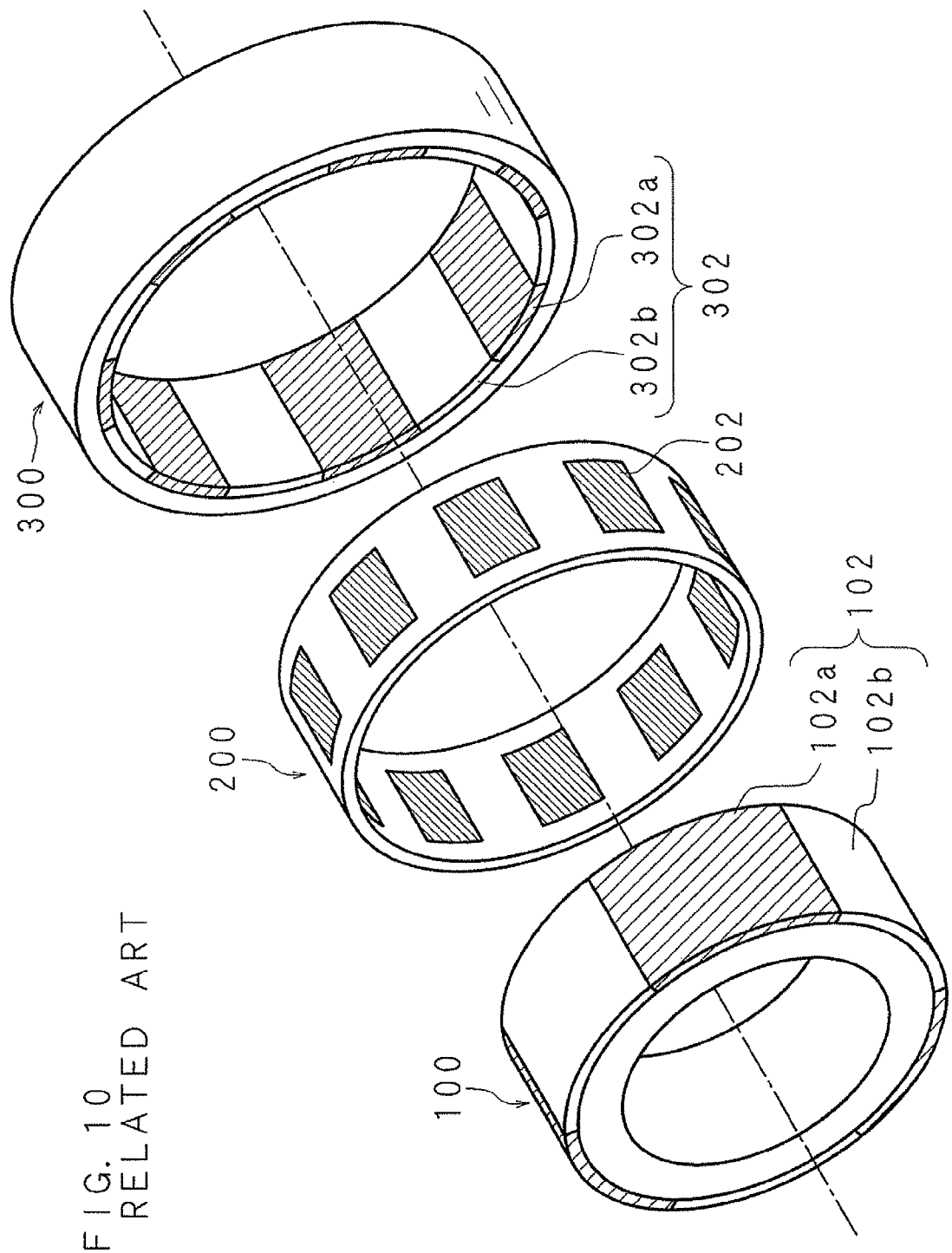
FIG. 10 is a schematic assembly view that shows an example of a cylindrical rotary type magnetic gear device of the related art.

The fourth embodiment suppresses the eddy current loss of the cylindrical linear type magnetic gear device compared to the third embodiment that suppresses the eddy current loss of the flat plate linear type magnetic gear device. FIG. 9 is a schematic assembly view that shows an example of the cylindrical linear type magnetic gear device. Furthermore, FIG. 9 shows a part per unit length ΔL in the cylindrical axial direction of the cylindrical linear type magnetic gear device extending in the cylindrical axial direction. The cylindrical linear type magnetic gear device includes a cylindrical internal column 700, a cylindrical external column 900 into which the internal column 700 is fitted at an interval, and an intermediate yoke 800 fitted between the internal column 700 and the external column 900 at an interval. The internal column 700 has a cylinder 701 formed of a magnetic material, and on an outer peripheral surface of the cylinder 701, six magnetic pole pairs 702 each of which includes a magnet 702a with N pole at outer side and a magnet 702b with S pole at outer side magnetized in a thickness direction are placed per unit length ΔL in the cylindrical axial direction.

Furthermore, the external column 900 has a cylinder 901 formed of a magnetic material, and, on an inner peripheral surface of the cylinder 901, fourteen magnetic pole pairs 902 each of which includes a magnet 902a with N pole at inner side and a magnet 902b with S pole at inner side magnetized in a thickness direction are placed per unit length ΔL in the cylindrical axial direction. Herein, the magnet being magnetized in the thickness direction means that the magnet is magnetized so that the inner peripheral surface side and the outer peripheral surface side are different poles. For example, the magnet 702a is configured so that the outer peripheral surface side and the inner peripheral surface side are magnetized to the N pole and the S pole, and the magnet 702b is configured so that the outer peripheral surface side and the inner peripheral surface side are each magnetized to the S pole and the N pole.

Side surfaces extending in the cylindrical axial direction of each of the internal column 700 and the external column 900 are guided and supported by a guidance member (not shown), and the internal column 700 and the external column 900 are freely moved in the cylindrical axial direction. When the external column 900 is linearly moved in the cylindrical axial direction, the internal column 700 is moved in the cylindrical axial direction by the magnetic interaction between the magnetic pole pairs 702 and 902 each included in the internal column 700 and the external column 900. A ratio Ph/Pl between the number Ph per unit length ΔL of magnetic pole pairs placed in the internal column 700 and the number Pl per unit length ΔL of magnetic pole pairs placed in the external column 900 is a gear ratio of the internal column 700 relative to the external column 900.

In the example of the magnetic gear device shown in FIG. 9, the gear ratio is 3/7. The intermediate yoke 800 holds the twenty ferromagnetic magnetic materials 802 of the total of the numbers 6 and 14 per unit length ΔL of the magnetic pole pairs included in the internal column 700 and the external column 900 per unit length ΔL in the cylindrical axial direction at equal intervals. The holding member 801 has a pair of holding rods (holding portions) 801a and 801a facing each other in the cylindrical axial direction of the internal column 700 and the external column 900, and two connection circular rings (connection circular ring bodies) 801b per unit length ΔL that are placed in the cylindrical axial direction substantially at equal intervals and connect the pair of holding rods 801a and 801a in the facing direction.

The number 2 per unit length ΔL of connection circular rings 801b is a divisor of the number 6 per unit length ΔL of magnetic pole pairs 702 included in the internal column 700, the number 14 per unit length ΔL of magnetic pole pairs 902 included in the external column 900, and the number 20 per unit length ΔL of magnetic materials 802 included in the intermediate yoke 800. As a result, the alternating magnetic field intersecting with each opening portion of the holding member 801 constantly includes each harmonic component having the integer multiple of each period of the $Ph^{th}$ harmonic component, the $(Ns-Ph)^{th}$ harmonic component, and the $(Ns+Ph)^{th}$ harmonic component in the cylindrical axial direction. Moreover, the eddy current does not flow through the closed loop constituted by the facing parts of the holding rods 801a and 801b forming the peripheries of each opening portion and the connection circular ring 801b.

The magnetic gear device shown in the present embodiment may change the relative movement speed of the external column 900 relative to the internal column 700 by moving the intermediate yoke 800. Furthermore, the external column 900 may be immobilized and the internal column 700 may be moved along with the movement of the intermediate yoke 800. In addition, the internal column 700 may be immobilized and the external column 900 may be moved along with the movement of the intermediate yoke 800.

The above-mentioned embodiments are examples of the invention, and the invention can be carried out in various modified forms within the scope defined based on the matters described in the claims and the descriptions of the claims.

As this invention may be embodied in several forms without departing from the sprit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A magnetic gear device comprising:
   a first movable element and a second movable element facing each other in which a plurality of magnetic pole pairs are each placed in a specific direction substantially at equal intervals; and
   a holding member that is placed between the first movable element and the second movable element and holds a plurality of magnetic materials in the specific direction substantially at equal intervals,
   wherein the number of the plurality of magnetic materials held by the holding member is a difference between or a total of the numbers of the plurality of magnetic pole pairs included in the first movable element and the second movable element,
   the holding member includes:
      a plurality of holding portions that hold the plurality of magnetic materials, and
      connecting rods that are placed in the specific direction substantially at equal intervals and connect the plurality of holding portions,
   the plurality of holding portions face each other via the plurality of magnetic materials, and
   each number of the plurality of magnetic pole pairs included in the first movable element and the second movable element is set to have the number of connecting rods as a divisor.

2. The magnetic gear device according to claim 1, wherein the first movable element and the second movable element are cylinders,
   the plurality of magnetic pole pairs are placed on an outer peripheral surface of the first movable element in a circumferential direction,
   the second movable element has an inner peripheral surface facing the outer peripheral surface of the first movable element, the plurality of magnetic pole pairs are placed on the inner peripheral surface in the circumferential direction,
   the specific direction is the circumferential direction of the cylinder, and
   the holding portions are a plurality of circular rings that hold the plurality of magnetic materials between facing portions in the circumferential direction.

3. The magnetic gear device according to claim 1, wherein the first movable element and the second movable element form a disk shape and are oppositely placed,
   the plurality of magnetic pole pairs are radially placed in each of the first movable element and the second movable element, the specific direction is a circumferential direction of a disk, and the holding portions are constituted by a plurality of concentric circular ring bodies holding the plurality of magnetic materials.

4. The magnetic gear device according to claim 1, wherein the holding member is able to be moved.

5. The magnetic gear device according to claim 1, wherein one of the first movable element and the second movable element is able to be immobilized.

6. A magnetic gear device comprising:

a first movable element and a second movable element facing each other in which a plurality of magnetic pole pairs are each placed in a specific direction substantially at equal intervals; and a holding member that is placed between the first movable element and the second movable element and holds a plurality of magnetic materials in the specific direction substantially at equal intervals, wherein the number of the plurality of magnetic materials held by the holding member is a difference between or a total of the numbers of the plurality of magnetic pole pairs included in the first movable element and the second movable element, the holding member includes:
    a plurality of holding portions that hold the plurality of magnetic materials, and
    connecting rods that are placed in the specific direction substantially at equal intervals and connect the plurality of holding portions, the plurality of holding portions face each other via the plurality of magnetic materials, and the number of connecting rods is a divisor of each number of the plurality of magnetic pole pairs included in the first movable element and the second movable element.

7. A magnetic gear device comprising:

a first cylindrical movable element in which a plurality of magnetic pole pairs are placed on an outer peripheral side in a circumferential direction substantially at equal intervals;

a second movable element to which the first movable element is fitted on an inner peripheral side at an interval and in which a plurality of magnetic pole pairs are placed on the inner peripheral side in the circumferential direction substantially at equal intervals; and a holding member that is placed between the first movable element and the second movable element and holds a plurality of magnetic materials in the circumferential direction, wherein the number of the plurality of magnetic materials held by the holding member is a difference between or a total of the numbers of the plurality of magnetic pole pairs included in the first movable element and the second movable element, the holding member includes:
    a plurality of circular rings that hold the plurality of magnetic materials and face each other via the plurality of magnetic materials, and
    a connecting rod that connects connection positions placed in the circumferential direction of each of the plurality of circular rings, in a facing direction of the plurality of circular rings, and the connection positions are selected and placed from divided positions obtained by dividing circumferences of each of the plurality of circular rings substantially at equal intervals, by the use of a divisor of each number of the plurality of magnetic pole pairs included in the first movable element and the second movable element.

8. The magnetic gear device according to claim 7, wherein the holding member is able to be moved.

9. The magnetic gear device according to claim 7, wherein one of the first movable element and the second movable element is able to be immobilized.

10. A holding member holding a plurality of magnetic materials between a first movable element and a second movable element facing each other in which a plurality of magnetic pole pairs are placed in a specific direction substantially at equal intervals, the holding member comprising:

a plurality of holding portions configured to hold the plurality of magnetic materials in the specific direction substantially at equal intervals; and connecting rods placed in the specific direction substantially at equal intervals to connect the plurality of holding portions, wherein the plurality of holding portions face each other via the plurality of magnetic materials, and the number of connecting rods is a divisor of each number of the plurality of magnetic pole pairs included in the first movable element and the second movable element.

\* \* \* \* \*